Jan. 8, 1963  H. R. BERGLAND ETAL  3,072,048
STOP MECHANISM CONTROL FOR RECORD FEEDING APPARATUS
Filed Sept. 28, 1960  3 Sheets-Sheet 1

Fig.1.

INVENTORS
HARRY R. BERGLAND
ALFRED R. WAGNER
BY
ATTORNEY

Fig. 3.

United States Patent Office 3,072,048
Patented Jan. 8, 1963

3,072,048
STOP MECHANISM CONTROL FOR RECORD FEEDING APPARATUS
Harry R. Bergland, St. Clair Shores, and Alfred R. Wagner, Detroit, Mich., assignors to Burroughs Corporation, Detroit, Mich., a corporation of Michigan
Filed Sept. 28, 1960, Ser. No. 58,943
9 Claims. (Cl. 101—100)

This invention relates to stop mechanism control for record feeding apparatus, and particularly to apparatus in which information such as amounts, account numbers, etc., is recorded on a check or other document.

The present application is a continuation-in-part of an application filed by Harry R. Bergland and Alfred R. Wagner on August 2, 1960, Serial No. 47,036, titled "Recording Apparatus," and assigned to the same assignee as the present application. Reference is also made to an application by William A. Monticello and Thomas Yesowich filed May 31, 1960, Serial No. 33,017, titled "Recording Apparatus," now Patent No. 3,018,721, assigned to the same assignee as the present application.

Both of the above-referenced patent applications disclose machines particularly useful in mechanized check handling systems where the information borne by the check or other document is carried in such a way as to enable it to be read and processed by automatic equipment directly from the source document or check itself. The banking industry in the United States has adopted magnetic ink character recognition as a common machine language for mechanized check handling. Under this system the information is printed on the document in magnetic ink using a type font that can be optically read by person as well as magnetically read by machine. The bottom edge of the check has been designated as the printing location and carries the various types of information in the several designated fields, the field at the rightmost portion of the check being for the amount information, and the field to the left thereof being for the account number information.

The above-identified patent application of Bergland et al. describes a printing apparatus having printing elements settable in accordance with information entered in a keyboard, feeding means for delivering the record media into printing position, and means controlling the feeding means so as to select the field of the record media in which the information is to be applied. In that apparatus, printing may be effected selectively in the amount encoding field of the check or in the account number encoding field of the check, and therefore the apparatus includes two check stops in the path of feed, one adapted to intercept the check in the amount printing position, and the other adapted to intercept it in the account number printing position. That application also describes control means to determine which of the stops will be effective to intercept the check during the cycling of the machine, and thereby, whether the information will be printed in the amount field or in the account number field. As a further feature, it also provides means for automatically controlling the stops to position the check in one field during the first cycle of the machine, and then in the other field during the immediately succeeding cycle, this being referred to as a combined, or Amount and Account Number, operation.

A substantial part of the apparatus described in the above-identified Bergland et al. application Serial No. 47,036 is common to the machine described in the above-identified Monticello et al. application Serial No. 33,017 which is directed, in the main, to the printing means and printing controls utilized in the machine, and therefore reference may be had to the latter-mentioned application for further details of the over-all construction of the machine.

In the above-described Bergland et al. application, the check stop which is effective in that cycle to intercept the check must be in its raised position at the beginning of the cycle (otherwise the machine would not cycle by various electrical interlocks provided), must remain in that position until printing has occurred at which time the stop is lowered to permit the check to pass therover, and must be in a raised position again before the beginning of the following cycle. The effective check stop is controlled by a cam coupled to the cam shaft of the machine, the control being such that the check stop is in its normal elevated position at the beginning of the machine cycle until 195° of the cycle, then lowers until it reaches its lower position at 235° in the cycle, remains in that lowered poistion until 345° in the cycle in order to permit the check, following printing (between about 153° and 168°), to pass thereover, and then rises to its elevated position which it reaches at about 355° of the cycle where it remains and is found at the beginning of the next machine cycle.

It has been found that this cyclic control of the stops, particularly the raising of these stops just before the end of the cycle so that they will be in their raised positions at the beginning of the succeeding cycle, can occasionally catch a check before it has passed over and cleared the stop. This can occur where there is considerable slippage between the feeding belt and the check, especially with respect to checks of longer lengths than average.

The present invention has for its object to overcome this drawback by providing means to insure that the effective check stop will not be permitted to return to its raised position until the check has cleared the area where it could possibly be caught by the stop. In the event the machine is programmed for a combination operation, that is for an Amount operation during the first cycle and an Account Number operation during the second cycle, then the check cannot clear the machine at the end of the first cycle in order to permit the stop to return to its raised position, and therefore separate means are provided for accomplishing this. In addition, if a check should become snagged in the machine, the check may be removed by pivoting the main printing unit, giving access to the check which is then manually removed, and the apparatus provides further means for restoring the effective check stop to its normal, raised position when a check is manually removed in this manner.

The novel features of the invention are set forth in the appended claims, but the invention itself can be best understood by the description of the machine embodying the invention set forth below in connection with the accompanying drawings, in which:

General Construction

For purposes of relating the present application to the above-identified Bergland et al. application, Serial No. 47,036, as well as to the above-identified Monticello et al. application, Serial No. 33,017 now Patent No. 3,018,721, the reference numerals applied herein to new parts not common to parts shown or specifically identified in those applications, in the main, begin with the number "500," so that all parts carrying a smaller reference numeral will be recognized as in all probability identifying a part shown in one or both of said earlier-filed applications.

Figure 1:
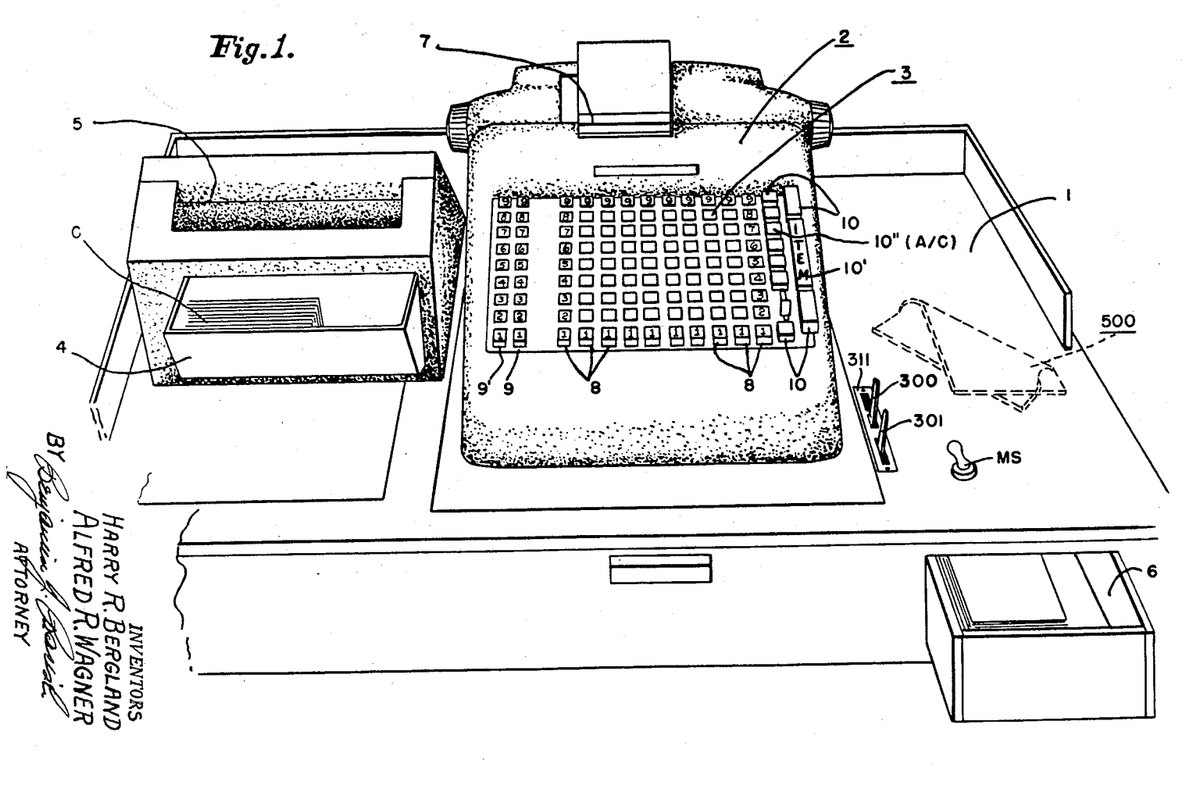
FIG. 1 is a perspective view of one form of apparatus embodying the present invention, the apparatus illustrated being that described in the above-identified application of Bergland et al. Serial No. 47,036, of which the present application is a continuation-in-part, this apparatus being of the general type and similar in many respects to the apparatus described in the above-identified Monticello et al. application Serial No. 33,017.

The general construction of the apparatus is illustrated in FIG. 1 and includes a stand 1 carrying a printing control unit 2 having a keyboard 3 in which amount information is entered and machine operations are controlled by depressing the appropriate keys. A plurality of checks C are retained in a storage hopper 4 and are manually fed into a feeding chute 5. From there they are transported by means housed within stand 1 until they are positioned in their proper locations under unit 2 at which time the amounts entered on keyboard 3 are printed thereon. After printing, the checks are fed to a receiving hopper 6 where they accumulate in stacked formation until the hopper is emptied.

Unit 2 is described with respect to the present invention as the means for introducing the numerical information and controlling the printing thereof on the checks, but it is actually a complete adding machine including not only the keyboard 3 but also its own accumulation mechanism, its own tape printing mechanism 7, etc. Hence, it may be referred to as the adding machine unit. Actually unit 2 performs many functions incident to a proving operation, as for example, proving the totals of batches of checks with respect to their batch tickets. The machine illustrated is basically a Burroughs "Series P" full keyboard adding machine that has been modified to incorporate the persent invention as described more fully in the above-identified Monticello et al. and Bergland et al. patent applications. It includes ten columns of numerical keys 8, two columns of code identification keys 9 and 9', and a number of operation control keys 10 which occupy about the equivalent of two columns on the keyboard. Numerical keys 8 are used to enter numerical values into the machine, and also to control the electrical circuit (through switch SW4, FIG. 3) as will be described; keys 9 and 9' print various predetermined code symbols, and also exert some control over the printing as described in the above-identified Monticello et al. patent application; and the operation control keys 10 are used to initiate a cycle of operation of the machine and to exercise various other operational controls most of which are not involved in the present invention to any great extent. Item key 10' and A/C key 10" of the operation control keys are about the only ones of significance in describing the present invention, and therefore the other operation control keys are not labeled or described herein in the interests of simplifying the present description. The Item key 10' operates a switch (SW3, FIG. 3) which controls the cycling of the apparatus in a manner similar to the above-identified Monticello et al. application. The A/C key 10" is normally a non-add key, in so far as its function in adding machine unit 2 is concerned, but has been modified herein by the inclusion of a switch (SW13, FIG. 3) to control the Account Number operation of the present apparatus, and is therefore also herein referred to as the Account Number key.

Adding machine unit 2 overlies the means that feed the checks from chute 5 to the storage hopper 6, and is hingedly mounted to stand 1, so that should a check be caught in the feeding means, unit 2 may be pivoted upwardly to expose the caught check and to permit its manual removal.

Figure 3:
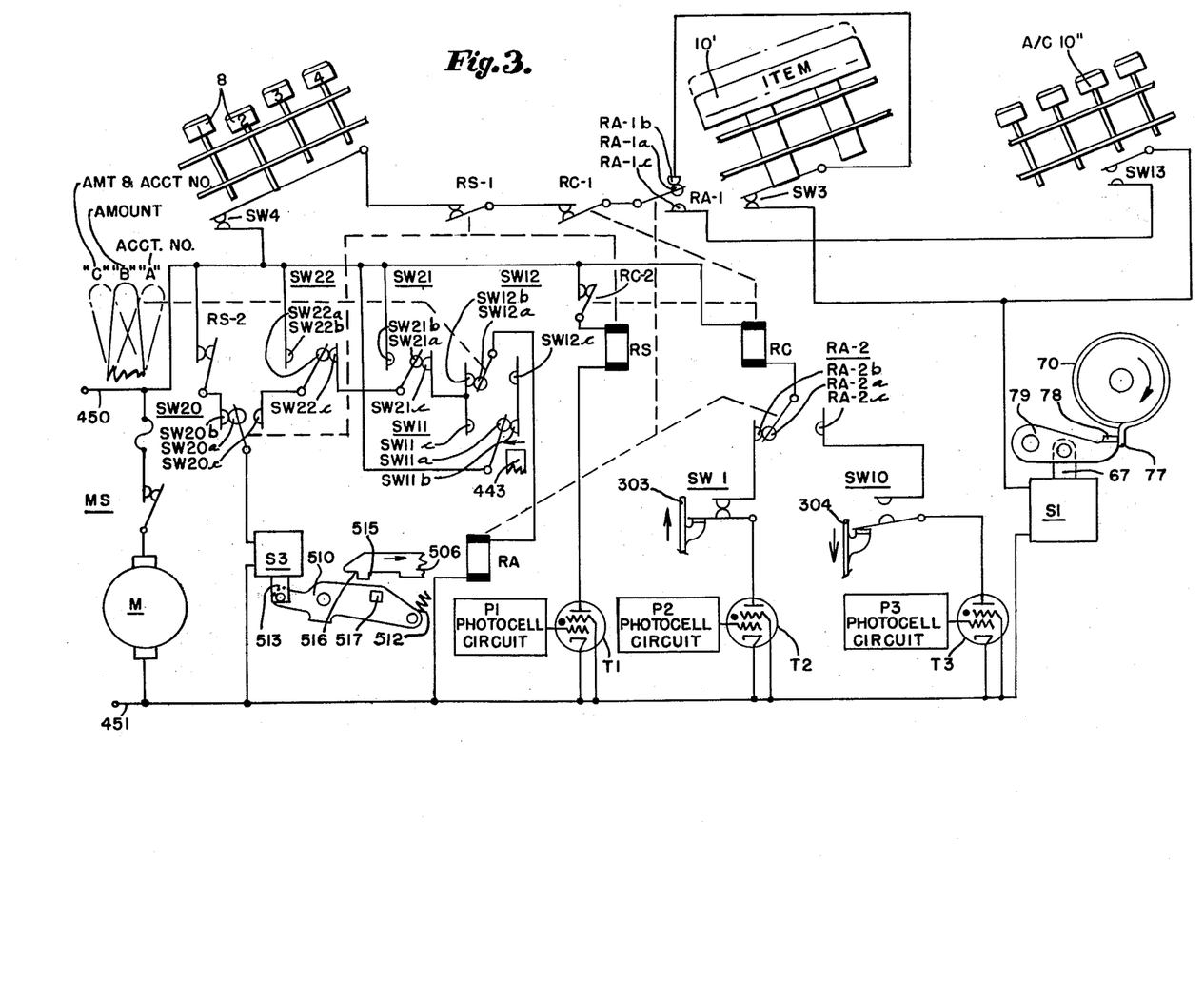
FIG. 3 is a circut diagram schematically illustrating the circuit of the above-identified Bergland et al. patent application and the modifications of the circuit to incorporate the present invention.

The drive for the apparatus is substantially the same as in the above-identified applications of Monticello et al. and Bergland et al., and includes a drive motor M and a single-cycle clutch operated by cycling solenoid S1, both schematically illustrated in the circuit of FIG. 3. Motor M is turned on by a manual switch MS disposed just to the right of the keyboard, so that the motor is in continuous operation whenever the apparatus is in use. The single-cycle clutch operated by solenoid S1 is described in detail in the above-identified Monticello et al. application. It is of the type where a torsion spring 70 overlies, but is normally disengaged from, a pair of drums, one coupled to the drive means and the other coupled to the driven load. When the clutch is to be operated, the spring 70 is permitted to contract and to tightly grip the drums thereby effecting the coupling. As illustrated particularly in FIG. 3, the cycling solenoid S1, when energized, pulls down its armature 67 and lever 79 so as to remove arm 78 from engagement with a lip 77 of the coupling spring 70, permitting spring 70 to contract and thereby to effect the coupling between the two drums. One drum is coupled to the drive from motor M, and the other drum is coupled to cam shaft 40, whereby it is seen that the cam shaft will be engaged one cycle of revolution every time cycling solenoid S1 is energized. Cam 92 carried by cam shaft 40 cotnrols the check stop mechanism.

Figures 2, 2A:
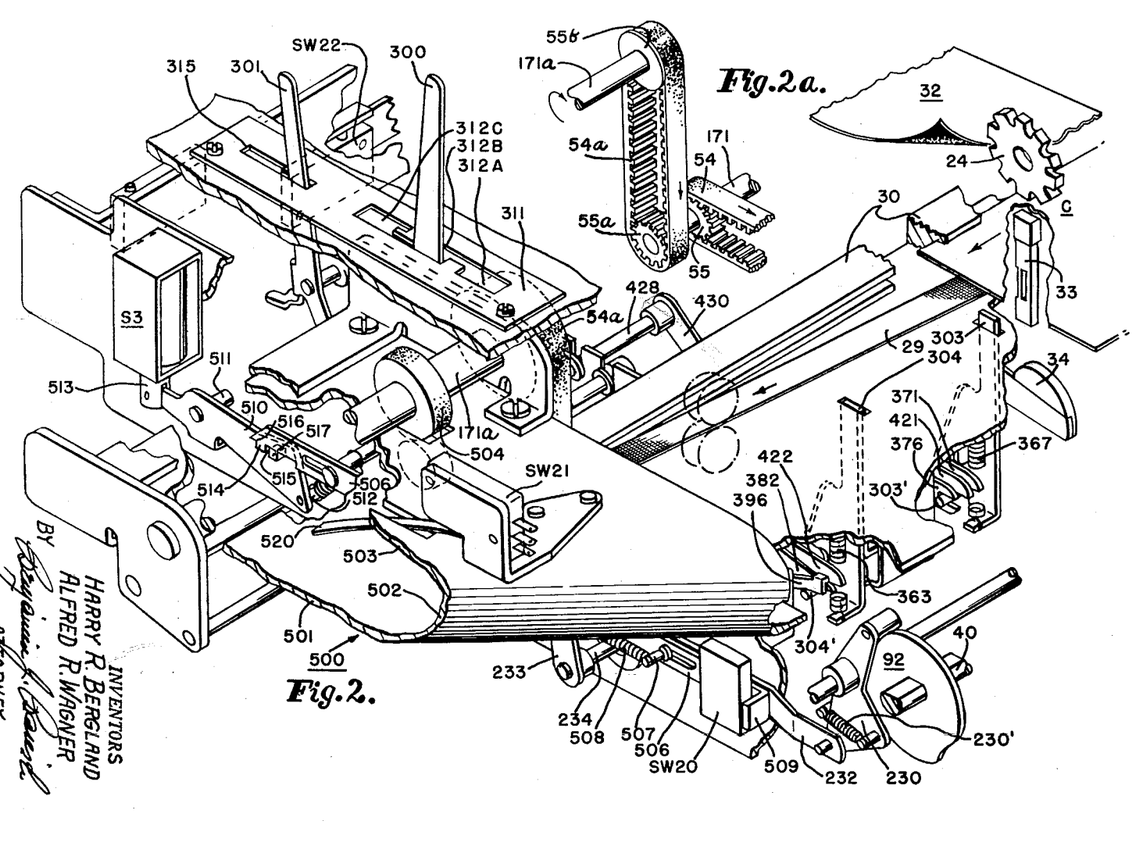
FIG. 2 is a perspective view of as much of the mechanism described and illustrated in the above-identified Bergland et al. application as is necessary to explain the present invention, the view being taken from the rear of the machine.
FIG. 2a is a detail perspective view of a part of the drive in the check feeding means of FIG. 2.

Briefly describing the operation of the apparatus, a check C inserted in the feeding chute 5 (FIG. 1) is transported by belt feeding means 29 (FIG. 2) through a guide plate 30 to a position underlying printing wheels 24. The printing wheels are set by the information entered into the keyboard 3 of the adding machine unit 2. The check is halted in this printing position by the check stop mechanism which is raised into the path of the check to intercept it in position under the printing wheels 24. Underlying the printing wheels is an impression producing mechanism, comprising an interposer 33 and hammer 34 for each printing wheel, which applies a hammer impact to force the check against the printing wheels and to thereby produce an impression of the amounts set up in the printing wheels. These amounts are printed on the check by means of an ink ribbon 32 (of magnetic ink) passing between the printing wheels 24 and the check C. After printing, the check stop mechanism is lowered to permit the check to pass thereover whereupon it travels to the ejecting chute 500 and thenceforth to the receiving hopper 6. The ejecting chute 500 is not specifically illustrated in the above-identified Monticello et al. or Bergland et al. patent applications, but it includes a horizontal entrance wall 501 which the check first reaches after printing, a curved wall 502 which turns the check over so that the final sequence of checks remains the same as in the beginning, and a horizontal exit wall 503 overlying the entrance wall 501. The check is propelled from exit wall 503 into the receiving hopper 6 by a drive disk 504 extending through a slot in the exit wall 503. The drive disk may be coupled to any suitable part of the drive where it will be continuously driven during the continuous operation of the drive motor M. As illustrated in FIGS. 2 and 2a, the drive is taken from belt 54 and toothed wheel 55 coupled to the motor M, wheel 55 carrying another toothed wheel 55a coupled to another belt 54a to a further toothed wheel 55b fixed to a shaft 171a, the drive disk 504 being carried by shaft 171a.

Check Stop Mechanism

In the present apparatus, as in the above-identified Bergland et al. application, two check stops 303 and 304 are utilized. Stop 303 intercepts the check to position it for printing in the amount encoding field with respect to printing wheels 24, and corresponds generally to stop 31 of the above-identified Monticello et al. application. Stop 304 intercepts the check to position it for printing in the account number encoding field with respect to printing wheels 24, there being no stop in the above-identified Monticello et al. patent application comparable to this one.

The described apparatus utilizes a pair of levers 300 and 301 for controlling stops 303 and 304, the levers projecting through a slotted plate 311 just to the right of the keyboard 3 such as to be conveniently manipulatable by the machine operator. Lever 300 controls the programming means for determining the field of the check in which the numerical values introduced in the keyboard 3 will print, that is, in the amount field or in the account number field. Lever 301 is a reject lever to eject the check from the apparatus whenever the occasion requires, such as when a malfunction occurs and the machine is prevented from cycling.

Control lever 300 is settable to three positions:

(a) When set in its rear position "A," it controls the mechanism to position the check for an Account Number operation, i.e. for printing from wheels 24 in the account number encoding field of the check. This requires that amount stop 303 be in its lowered position at the beginning of the machine cycle to permit the check to pass thereover; and that account number stop 304 be raised to intercept the check, then lowered after printing to permit the check to pass thereover, and then raised to intercept the next check at the beginning of the succeeding cycle.

(b) When control lever is set in its middle position "B," it positions the check for an Amount operation, i.e. for printing in the amount encoding field, which therefore requires that the amount stop 303 be in its raised position at the beginning of the machine cycle, lowered during the cycle, and then raised for the next cycle. The account number stop 304 is held down to permit the check to pass over during the machine cycle when the amount stop 303 is lowered.

(c) When the control lever 300 is set in its front position "C," it controls the mechanism for a combined operation, i.e. an Amount and Account Number operation, where during the first machine cycle the check will be positioned for printing in the amount encoding field, and during the next succeeding cycle the check will be positioned for printing in the account number encoding field. This operation requires that at the beginning of the first cycle both stops 303 and 304 be raised, that amount stop 303 be lowered during the cycle, that at the beginning of the second cycle the amount stop 303 be held down and the account number stop 304 remain raised, that the account number stop 304 be lowered during the cycle, and that the stops be restored in their initial conditions before the beginning of the next cycle. Under this operation, the operator would print the amount by depressing the appropriate keys 8 of the keyboard 3 and cycling the machine to print that amount in the amount encoding field of the check, and would then print the account number by depressing the appropriate keys in the same keyboard 3 and recycling the machine to print that information in the account number encoding field. The check positioning is automatically effected by the control exerted from the setting of lever 300.

Reject lever 301 projects through slot 315 of plate 311 and, when it is operated, it lowers both check stops 303 and 304 and thereby causes the check to be ejected by the feeding belt 29. This lever is operated whenever the operator desires to eject the check without cycling the machine.

Referring to the mechanism for controlling the stops, each of the check stops 303 and 304 normally assumes a raised position under the influence of its springs 367 and 363, respectively, but is movable to a lowered position by anyone of three elements acting on each of the pins 303' and 304' for the stops. With respect to amount stop 303, the three elements operable to lower the stop include a forked arm 376 engageable with pin 303' of the stop, the arm being settable to permit stop 303 to assume a raised or a lowered position at the beginning of the cycle; another arm 371 controlled by cam 92 of cam shaft 40 during a machine cycle to lower the stop 303 at the appropriate time in the cycle; and an arm 421 movable by reject lever 301 to lower stop 303 whenever the reject lever is operated. For operating account number stop 304, the three elements engageable with pin 304' of the stop include arm 396 which is settable at the beginning of the cycle to permit stop 304 to assume a raised or lowered position at the beginning of the cycle; arm 382 which is controlled by cam 92 to lower stop 304 at the appropriate time in the cycle; and arm 422 movable by reject lever 301 to lower the stop whenever the reject lever is operated.

As described in detail in the above-identified Bergland et al. application, when lever 300 is set in its "A" position, i.e. in slot 312A, its setting is transmitted through mechanical linkages including elements 428 and 430 to programming means to control the apparatus to perform an Account Number operation, whereupon before the machine cycles, the amount stop 303 will be in its lowered position, effected by the lowering of a forked arm 376, and the account number stop 304 will be in its raised position, effected by arm 396 being raised to permit spring 363 to urge the stop upwardly. Thus, at the beginning of the cycle during an Account Number operation, the check will pass over amount stop 303 and will be intercepted by the raised account number stop 304 so that the printing wheels 24 will overlie the account number encoding field of the check. During the machine cycle, after printing has been completed, cam 92 carried by cam shaft 40 rocks arm 230 to move slide 232 rightwardly as viewed in FIG. 2, also loading spring 230' fastened between arm 230' and a pin fixed to the frame. This movement of slide 232 rocks arm 233 and shaft 234 to cause arm 382 overlying pin 304' of the account number stop 304 to be depressed, thus lowering the stop. This action occurs at about 195°–235° of the machine cycle and is described in detail in the above-identified Bergland et al. application. Cam 92 maintains slide 232 in its rightward position from 235°–345° of the machine cycle, at which time the cam tends to permit spring 230' to restore the slide to its normal leftward position to restore stop 304 to its raised position. The present invention modifies this action somewhat as explained below. Stop 304, which is the stop active during this Account Number operation, thereby tends to be raised before the completion of the cycle, so that it will assume a raised position at the beginning of the succeeding cycle for intercepting the succeeding check.

The apparatus operates in a similar manner in an Account operation, i.e. when lever 300 is set in the "B" position in slot 312B, except that the amount stop 303, rather than the account number stop 304, is the active one. That is, the account number stop 304 is held in its lowered position at the beginning of the cycle (arm 396 bearing down against pin 304'), and the amount stop 303 is permitted to assume its raised position by the elevation of forked arm 376, straddling pin 303', by the setting of lever 300. During the machine cycle, slide 232 acting through the same mechanism as described above causes the amount stop to be lowered to permit the check to pass thereover and then tends to raise the stop just prior to the end of the cycle. In this operation, arm 371 engaging pin 303' of the amount stop is acted upon by the mechanism including slide 232 during the machine operation to lower and then raise the amount stop.

In the Amount and Account Number operation, effective when lever 300 is set in its "C" position in slot 312C, the first cycle of operation is similar in the respects discussed above to the Amount operation, and the second cycle of the machine is similar to the Account Number operation. That is, during the first cycle, stop 303 is the active one as controlled by cam 92, and positions the check for printing in the amount encoding field. During the second cycle, stop 304 is the active one and positions the check for printing in the account number encoding field.

Further details of the structure and the operation of the foregoing mechanism are set forth in the above-identified Bergland et al. application and are not included herein in order to simplify the description of the present invention. Only those elements which enter into the present invention are described herein in detail, and at this point one further feature present in the Bergland et al. application might be mentioned since it does enter into the operation of the present invention. That is the feature where a latch is actuated during the first cycle and retains the amount stop in its lowered position at the beginning of the second cycle, so as to prevent the amount stop from restoring and catching the check which at that time is positioned by the account number stop. This aspect of the latch feature is not of particular concern here. However, the latch also carries an ear, illustrated as 443 in FIG. 3 hereof, which operates a switch SW11 when the latch is actuated. This switch enters into the circuit embodying the present invention and will be described below.

Turning to the specific improvement of the present invention, it was found that when the mechanism was operated as described above, the restoration of the active check stop could catch a check before it could be ejected from the machine. This was found to occur when there was considerable slippage between the feeding belt and the check, and particularly when the check was longer than the usual size. The present improvement to this mechanism obviates this possible malfunction and provides positive means to assure that the active stop will not be permitted to rise until the check has passed out of the area where it might be caught by the stop.

*Improved Check Stop Control*

The improved check stop control acts on the mechanism for lowering and raising arms 371 and 382 at the proper time in the cycle, and particularly on the mechanism of slide 232, arm 233 and rock shaft 234. It will be recalled from the foregoing description, slide 232 is moved rightwardly in FIG. 2 by cam 92 at 195°–235° of the machine cycle and thereby acts through arm 233 and rock shaft 234 to lower the active check stop 303 or 304. It remains in its moved position from 235°–345° to keep the active stop in its lowered position and to thereby permit the check to pass thereover. From 345°–355°, spring 230', which was loaded by cam 92 during the 195°–235° movement, tends to restore the slide to its normal position to raise the active stop, where it and the active stop are found at the beginning of the next cycle. The present invention provides means for restraining the foregoing mechanism, particularly arm 233 and shaft 234, from restoring the active stop until the check has passed the area where it could possibly be caught by the restoring stop.

As illustrated in FIG. 2, a second slide 506 is yieldingly coupled to slide 232 by a broken joint comprising a pin 507 of the latter received in a slot of slide 506 and a spring 508 connected at one end to pin 507 and at the other end to slide 506. One end of the slide 506, the end proximate to cam 92, is provided with an inturned ear 509, the purpose of which is described below.

Arm 233 is coupled to slide 506 so that as the latter slide is moved by slide 232, arm 233 and rock shaft 234 are actuated to lower the active stop, 303 or 304 as the case may be. Slides 232 and 506 are normally positioned as illustrated in FIG. 2. During the machine cycle when slide 232 is moved (rightwardly as viewed in FIG. 2) by cam 92, slide 506 will normally follow by virtue of coupling spring 508, and when slide 232 is restored to its normal position, slide 506 will also follow. The present invention provides latching mechanism for retaining slide 506 in its moved position, so as to prevent arm 233 and shaft 234 from restoring the active stop to its raised position until the check has passed the area where it is liable to be caught.

The latching mechanism, as illustrated in FIG. 2, includes a latching plate 510 pivotally mounted on a pin 511 and normally retained in an upward position against slide 506 by a spring 512, but pivotal to a lower position away from the slide by an armature 513 of a solenoid S3. This latching mechanism is disposed at the end of slide 506 remote from cam 92, which end is provided with a depending lug 514 defining a shoulder 515 on one side thereof and another shoulder 516 on the opposite side thereof. Latching plate 510 carries a square stud 517 receivable in one or the other of these shoulders depending upon the position of the slide 506. The arrangement is such that, with solenoid S3 de-energized, when the slide is moved by cam 92, stud 517 would normally seat against shoulder 516 of the slide, but when the slide 506 is in its normal home position, the stud would seat against shoulder 515. When the solenoid S3 is energized, the latching plate 510 is pivoted to lower stud 517 and to disengage same from shoulders 516 or 515 of the slide.

In the operation of the apparatus, as will be described more fully below in connection with the discussion of the electrical circuitry and specific operations, solenoid S3 is normally energized at the beginning of the machine cycle so that latching plate 510 is pivoted out of engagement with slide 506. Accordingly, during the first part of the cycle cam 92 moves slide 232 (rightwardly as viewed in FIG. 2), and slide 506, moving therewith arm 233 and rock shaft 234 to lower the active check stop 303 or 304. As soon as slides 232 and 506 move, solenoid S3 is de-energized, by ear 509 controlling a switch SW20, permitting latching plate 510 to move into engagement with slide 506, stud 517 of latching plate 510 being thereby seated against shoulder 516 of slide 506. Slides 506 and 232 are thus not permitted to restore until solenoid S3 is re-energized, and as will be explained below, the latter solenoid is not energized until the check has passed the area where it could be caught by a restoring stop.

The apparatus provides electrical means for sensing the passage of the check past the area where it could conceivably be caught by a restoring stop, this means composing an electrical switch SW21 containing a leaf spring operator 520 passing through a slot in the exit wall 503 of the ejection chute 500 such as to be engageable by the check as it exits from the ejection chute into the receiving hopper 6. The specific control exerted by switch SW21 is described below in connection with the description of the electrical circuit.

A further switch SW22 is provided in case a check does become caught within the mechanism and has to be manually removed. As mentioned earlier, the adding machine unit 2 is hingedly mounted on stand 1 over the check feeding mechanism such that it may be pivoted upwardly by hand to provide manual access to any check that may be caught within the feeding mechanism. Switch SW22 is actuated when the unit 2 is pivoted upwardly for this purpose. The specific control exerted by switch SW22 is also described below in connection with the description of the over-all electrical circuit.

*Electrical Circuit*

FIG. 10 illustrates the essentials of the electrical circuit, the operating elements being shown in the positions they would occupy during an Amount operation since this is normally the most frequent operation of the apparatus.

Motor M is connected directly across the line comprising leads 450 and 451 through manual switch MS so that the motor is in continuous operation whenever the switch is manually closed.

Cycling solenoid S1 couples the motor to the apparatus for a single cycle of operation whenever the solenoid is energized. The energization circuit of the solenoid includes the three relays RA, RS and RC. Relay RA is energized only where the apparatus is to position the check for printing in the account number encoding field, which may occur when lever 300 is set in position "A" (for an Account Number operation), or during the second cycle of an Amount and Account Number operation when lever 300 is set in position "C." Relay RS is controlled by the skew detecting circuit (the optical system of which is not specifically illustrated herein), this circuit including photocell P1 detecting the proper registration of the check with respect to skew and tube T1 which conducts when the check is properly registered. Relay RC is controlled by the corner detecting circuits which include photocell P2 and the circuit including tube T2 for sensing the proper positioning of the check with respect to amount stop 303, and a further photocell P3 and the circuit including tube T3 for sensing the proper positioning of the check with respect to the account number stop 304. The optical systems of the foregoing are illustrated in the above-identified Bergland et al. application. Relays RS and RC must be energized as will be described below in order to actuate solenoid S1 and to thereby cycle the apparatus.

Turning now to the specific electrical circuit connections of FIG. 3, it is seen that relay RA is connected across the line through switches SW12 and SW11. Switch SW12 is a single-pole-double-throw switch operated by the movement of lever 300, such that when lever 300 is in its "B" or "C" positions, switch SW12 has its movable contact SW12a in engagement with contact SW12b, whereas when lever 300 is in its "A" position (for an Account Number operation), movable contact SW12a engages contact SW12c. Switch SW11 is also a single-pole-double-throw switch operated by ear 443 of the latch (not shown) which is actuated during the first cycle of a position "C" operation, as briefly mentioned above and as described in detail in the above-identified Bergland et al. application. By virtue of this operation of the latch, it is seen that contact SW11a will engage contact SW11b at the start of all machine cycles except at the start of the second machine cycle in an Amount and Account Number operation produced when lever 300 is set in position "C." Movable contact SW11a of switch SW11 is directly connected to lead 450 of the power supply, and movable contact SW12a of switch SW12 is directly connected to one side of the account number relay RA, the other side of which is connected to the other lead 451 of the power supply. Also, contact SW12b of switch SW12 is directly connected to contact SW11c of switch SW11, and contact SW12c of switch SW12 is directly connected to contact SW11b of switch SW11.

When lever 300 is set in its "A" position for an Account Number operation, contact SW12a of switch SW12 engages contact SW12c to energize relay RA through contact SW11b and contact SW11a. When lever 300 is set in its "C" position for an Amount and Account Number operation, account number relay RA will be in an energized condition at the beginning of the second cycle of that operation, through contacts SW12a, SW12b, SW11c and SW11a, the latter having been moved into engagement with SW11c by ear 443 of latch 410 as described above. At all other times, account number relay RA will be in a de-energized condition.

Relay RA includes two sets of contacts: RA-1 in the circuit which determines whether Item key 10' must be depressed to cycle the apparatus or whether A/C key 10" must be depressed; and RA-2 which determines whether the amount stop 303 will be active to control the circuit or whether the account number stop 304 will be active. Contacts RA-1 include a movable contact RA-1a which is normally in engagement with fixed contact RA-1b, but operable to engage fixed contact RA-1c when its relay RA is energized. Contact RA-1b is connected to solenoid S1 through switch SW3, and contact RA-1c is connected to the solenoid through switch SW13. It is thus seen that when relay RA is de-energized, the circuit of contacts RA-1 is completed through contact RA-1b and switch SW3, operated by Item key 10", to solenoid S1; whereas, if relay RA is energized, the circuit is completed through contact RA-1c and switch SW13, operated by the A/C key 10", to solenoid S1.

The other set of contacts RA-2 for relay RA is in the circuit for energizing corner relay RC. The latter relay assures that the check is properly positioned with respect to the appropriate stop (303 or 304) before the machine can cycle. Contacts RA-2 select the stop to be active in controlling the circuit. Thus, in the normal position of contacts RA-2 as illustrated in FIG. 10, which would be present when relay RA is de-energized, movable contact RA-2a engages fixed contact RA-2b to make the amount stop 303 effective to control the circuit. When relay RA is energized, however, as described above, contact RA-2 is operated to engage fixed contact RA-2c to make the account number stop 304 effective to control the circuit.

Contact RA-2 is connected to switch SW1 for amount stop 303, it being recalled that switch SW1 is closed whenever the amount stop is in its active (i.e. raised) position for intercepting the check at the beginning of a cycle. The circuit for the amount stop 303 also includes a photocell P2 and gas tube T2 which comprise the means for sensing the proper position of the check with respect to the amount stop.

The gas tube T2, controlled by photocell P2, is connected between switch SW1 of the amount stop 303 and one side of the line 451, and conducts when the check is properly positioned with respect to amount stop 303.

A similar arrangement is found in the circuit for account number stop 304. Contact RA-2c is connected to switch SW10 which is closed when the account stop 304 is in its raised position, switch SW10 being in turn connected through gas tube T3 to line 451. Gas tube T3 is controlled by a photocell circuit including photocell P3 adapted to cause tube T3 to conduct when the check is properly positioned with respect to stop 304.

It is thus seen that the circuit including switch SW10 for the account number stop 304 parallels the circuit including switch SW1 for amount stop 303, and that it is effective only when the account number relay RA is energized. These two parallel circuits are in series with corner relay RC, and therefore the effective one of these two circuits will control the energization of that relay. Relay RC must be energized in order to energize solenoid S1 to cycle the apparatus, which means that the active circuit, amount or account number as selected by contacts RA-2, must have its stop in the active (raised) position and must have the leading corner of the check properly registered with respect to its stop so as to block the light from its photocell.

Relay RC includes two sets of contacts, RC-1 in the circuit for energizing cycling solenoid S1, and contacts RC-2 in the circuit for energizing skew relay RS.

The circuit for skew relay RS includes, besides contacts RC-2, gas tube T1 controlled by photocell P1, to fire the relay when the check is properly positioned. Energization of relay RS closes its contacts RS-1 in the circuit of cycling solenoid S1, and contacts RS-2 in the circuit of the check stop latching solenoid S3 to be described.

First summarizing the operation of cycling solenoid S1, it is seen that this solenoid is connected from line 450 to line 451 through switch SW4 operated by numerical keys 8; contacts RS-1 of skew relay RS; contacts RC-1 of corner relay RC; and, as selected by contacts RA-1 of account relay RA, either switch SW3 as controlled by Item key 10', or switch SW13 as controlled by A/C key 10". Switch SW4 is closed whenever any one of keys 8 is depressed, and it is thus seen that the depression of at least one of these keys is a condition for energizing solenoid S1 to cycle the machine. Contacts RS-1 are closed whenever skew relay RS is energized, and it is thus seen that the energization of that relay, which occurs when the check is properly positioned with respect to skew, is also a necessary condition for cycling the apparatus. Contacts RC–1 are closed when corner relay RC is energized, and it is thus seen that the energization of that relay, which occurs only when the circuit for the active stop (amount stop 303 or account number stop 304) is completed, is also a necessary condition for the cycling of the apparatus. The circuit including switch SW3 is selected by contacts RA–1 when account number relay RA is de-energized, and it is therefore seen that when that occurs, Item key 10′ must be depressed thereby closing switch SW3, to cycle the apparatus. On the other hand, the circuit including switch SW13 is selected by contacts RA–1 when account number relay RA is energized, and it is thus seen that when this occurs A/C key 10″ must be depressed, which thereby closes switch SW13, in order to cycle the apparatus.

Turning now to the circuit for controlling the check stop latching solenoid S3, this circuit, as shown in FIG. 3, includes switch SW20 and the mentioned contacts RS–2 of skew relay RS in series with the latching solenoid across lines 450 and 451. At the beginning of a machine cycle, switch SW20 is in the condition illustrated in FIG. 3, i.e. with its movable contact SW20a in engagement with contact SW20b. It will also be recalled that at the beginning of the machine cycle, skew relay RS is energized, assuming the check is properly positioned for printing, and therefore its contacts RS–2 are closed. Accordingly, latching solenoid S3 would be energized at the beginning of the machine cycle.

As soon as slide 232 and therefore slide 506 move during the machine cycle, ear 509 moves out of engagement with switch SW20, which actuates the latter to cause its contact SW20a to move into engagement with its contact SW20c, and therefore the latching solenoid will be de-energized. The circuit for controlling the re-energization of the solenoid is now transferred through contact SW20c to switches SW22, SW21 and SW11.

Referring first to the circuit including switch SW21, this is the switch which is disposed in the ejection chute 500 to sense the passage of the check through the chute and therefore out of the area where it could be snagged by a restoring stop. Switch SW21 is a single-pole-double-throw switch in which its movable contact SW21a normally engages its contact SW21c. When a check passing through chute 500 engages the leaf spring operator 520 of the switch, its contact SW21a moves into engagement with its contact SW21b, which re-energizes solenoid S3 to remove the latching plate 510 and to permit slide 506 and the active stop to restore. As soon as the check passes, switch SW21 returns to its normal condition as illustrated in FIG. 3.

Switch SW22, as will be recalled, is actuated whenever the adding machine unit 2 is pivoted upwardly on its hinges to expose a check that has been caught in the feeding mechanism to permit the manual removal of that check. In its normal condition, when the adding machine unit 2 is in its normal position as illustrated in FIG. 1, the movable contact SW22a of switch SW22 engages its contact SW22c, but when the adding machine unit 2 is pivoted upwardly, contact SW22a moves into contact with SW22b.

The movable contact SW22a of switch SW22 is connected directly to contact SW20c of switch SW20; contact SW22c is connected to contact SW21a; contacts SW22b and SW21b are connected directly to the line 450; and contact SW21c is connected to the lead interconnecting contact SW12b of switch SW12 with contact SW11c of switch SW11.

The operations of the foregoing circuits will be disclosed below in connection with the detailed description of the over-all operation. Briefly, however, the foregoing circuits through switches SW22, SW21 and SW11 provide alternative circuits for re-energizing the latching solenoid under the required conditions. Thus, switch SW21 would normally re-energize latching solenoid S3 when the check has been passed through the ejection chute 500 and actuated switch SW21; switch SW22 would re-energize the solenoid if and when the adding machine unit 2 were lifted to manually remove the check; and the circuit including switch SW11 is used to re-energize the solenoid before the beginning of the second cycle of an Amount and Account Number operation, when the check does not pass through chute 500 but is rather intercepted by the account number stop 304.

*Operation*

The over-all operation of the apparatus can probably be best understood by a description of each of the specific operations referred to above, the Amount operation being described first and being treated most comprehensively since it is the one most frequently performed.

Referring first to the performance of the apparatus in an Amount operation, it will be recalled that the conditions of the various elements in the apparatus as illustrated in FIG. 3 are those they would assume at the beginning of a machine cycle in an Amount operation. Thus, control lever 300 would be set in its "B" position; Item key 10′ would be depressed; at least one of the numerical keys 8 would be depressed; and manual switch MS would of course be closed.

In an Amount operation, the active stop is amount stop 303, which means that this stop must be in a raised position at the beginning of the cycle to intercept the check, must be lowered during the cycle to permit the check to pass thereover, and must again be raised at the beginning of the next cycle if in that cycle the amount stop 303 is again to be the active one.

The closing of manual switch MS connects the motor across the line which drives the check feeding belt 29, this belt being continuously running when the apparatus is turned on. Setting lever 300 in its "B" position acts through the mechanism including linkages 428 and 430 to cause arm 396 to bear downwardly against pin 304′ which thereby lowers the account number stop 304. The amount stop 303, however, remains in its raised position under the bias of its spring 363, there being no elements bearing down upon its pin 303′ at this time.

The operator then takes a check C from the storage hopper 4, reads the amount, introduces the amount into the keyboard 3 of adding machine unit 2 by depressing the appropriate numerical keys 8, depress Item key 10′, and inserts the check into feeding chute 5, whereupon it would be fed by belt 29 until it is interposed in properly registered position by amount stop 303 for printing the introduced numerical values in the amount encoding field.

With the check intercepted and properly positioned by amount stop 303, the condition of the electrical circuit would be as illustrated in FIG. 3. It is to be particularly noted that the account number relay RA is de-energized since contact SF12a of switch SW12 energizes contact SF12b only when lever 300 is in its "B" position. Therefore, the two sets of contacts of relay RA in their illustrated "amount" positions. That is, contact RA–1a engages contact RA–1b thereby establishing the circuit to solenoid S1 through switch SW3 controlled by Item key 10′; and contact RA–2a engages contact RA–2b thereby establishing the circuit to relay RC through amount switch SW1 and its photocell P2 circuit including its gas tube T2.

It is thus seen that at this point, assuming the check is properly positioned, the active stop (amount stop 303 in thise case) is up and the appropriate keys have been depressed, relays RS and RC are energized, and therefore solenoid S1 is also energized to cycle the apparatus, the solenoid S1 energization circuit comprising line 450, switch SW4, contacts RS–1 (closed by the energization of skew relay RS) contacts RC–1 (closed by the energization of corner relay RC) RA–1c, contact RA–1b, switch SW3, solenoid S1 and line 451.

At this point and before the apparatus actually begins to cycle, slides 232 and 506 are in their leftward positions as viewed in FIG. 2, and therefore ear 509 of slide 506 is in engagement with switch SW20 causing the switch to assume the condition illustrated in FIG. 3, where its movable contact SW20a engages its contact SW20b. Skew relay RS, having been energized by the proper positioning of the check, causes its contacts RS-2 to be closed. It is thus seen that check stop latching solenoid S3 is also energized at this point, the circuit including contacts RS-2 and contacts SW20b and SW20a.

The energization of solenoid S3 causes it to pull up its armature 513 pivoting latching plate 510 downwardly, thus removing its square stud 517 from engagement with lug 514. Slide 506 is thereby free to move.

The energization of solenoid S1 causes it to pull down its armature 67 and lever 79 to couple cam shaft 40 to the drive through torsion spring 70 for a single cycle of operation of the apparatus.

Cycling of the apparatus differentially positions the printing wheels 24 in accordance with the numerical information entered into the keyboard, and causes printing to occur (between about 153° and 168°) by actuating hammers 34 to drive their respective interposers 33 against the check C, ink ribbon 32, and printing wheels 24. Mechanism for accomplishing this in the apparatus illustrated is described in the above-identified Monticello et al. application Serial No. 33,017.

With respect to the check stop mechanism, at about 195° (after printing has been completed), cam 92 begins to move slide 232 rightwardly as viewed in FIG. 2, this movement also loading spring 230'. Slide 506, being free of latching plate 510, moves therewith through coupling spring 508. This movement of slide 506 rocks arm 233 and shaft 234 and causes arm 371 to bear down against pin 303' of the amount stop 303 to lower the stop and to permit the check to pass over the stop into the ejection chute 500. The specific mechanism used in the apparatus for moving arm 371 downwardly is not necessary for an understanding of the present invention but is available from the above-identified application of Bergland et al. Serial No. 47,036. Between 195° and 235°, cam 92 moves slides 232 and 506 in the foregoing manner, idles until about 345°, and then permits spring 230' to restore the slides from 345° to 355°.

As soon as slide 232 moves rightwardly as viewed in FIG. 2, carrying with it slide 506, ear 509 of the latter slide disengages from switch SW20 which causes the movable contact SW20a to move from its contact SW20b to its contact SW20c. This de-energizes latching solenoid S3, and therefore latching plate 510 will move upwardly by spring 512 to position stud 517 against shoulder 516 behind lug 514. At 345°–355°, both slides tend to restore by the unloading of spring 230', i.e. unless solenoid S3 has been re-energized to pivot latching plate 510 and thereby its stud 517 out of the way of lug 514 to permit the slides to restore.

As the active check stop 303 is lowered, beginning at 195° and completed at 235°, the check passes thereover into feeding chute 500 where it engages the leaf spring operator 520 of switch SW21. When the latter switch is actuated by the check, thus assuring that the check is out of the area where it may be snagged by the restoring check stop, movable contact SW21a moves out of engagement with its contact SW21c into engagement with its contact SW21b, the latter contact being connected to lead 450. It is thus seen that as soon as the check actuates switch SW21, latching solenoid S3 is re-energized through the circuit including contacts SW20a and SW20c of switch SW20, contacts SW22a and SW22c of switch SW22, and contacts SW21a and SW21b of switch SW21. The energization of solenoid S3 causes same to pull up its armature 513 and to unseat from shoulder 516, which enables slides 232 and 506 to return (leftward as viewed in FIG. 2) to their original positions. This return of slide 506 restores arm 233, shaft 234, and arm 371, and thereby permits the amount stop 303 to restore to its raised position under the influence of its spring 367.

It will thus be appreciated that amount stop 303 cannot be restored to its upward position until latching solenoid S3 is re-energized to withdraw latching plate 510 from engagement with shoulder 516 of slide 506 and that switch SW21 must be actuated by a check passing through the ejection chute for accomplishing the foregoing. Unless and until solenoid S3 is re-energized, stud 517, being seated against shoulder 516, prevents the return of slides 232 and 506, and thereby the amount stop 303. This arrangement, therefore, assures that a check cannot be caught by a restoring stop even though there is considerable slippage between the check and the feeding belt or the check is of greater length than usual.

In case, however, a check should become caught in some other part of the feeding mechanism, which would require the operator to pivot the adding machine unit 2 to expose the check and to permit its removal manually, switch SW22 provides the circuit for re-energizing latching solenoid S3 and for restoring the active check stop 303. Switch SW22 is normally in a condition illustrated in FIG. 3, but is actuated to cause its contact SW22a to engage contact SW22b whenever the adding machine unit 2 is pivoted on its hinged mounting. Since contact SW22b is directly connected to lead 450 of the line, it is thus seen that latching solenoid S3 will be re-energized by this movement of the adding machine unit 2, which causes the disengagement of latching plate 510 from slide 506 and permits the restoration of the active stop, in the same manner as described above.

In this connection, it is to be borne in mind that the active check stop, whether amount stop 303 or account number stop 304, must be at its elevated position at the beginning of a machine cycle in which it is to intercept the check. This is assured by the earlier-mentioned switch SW1 for amount stop 303 and switch SW10 for account number stop 304 in the energization circuit (through relay RC) of cycling solenoid S1, it being recalled that the appropriate one of these two switches must be closed, which occurs only when its respective stop is in the raised position. Thus, the re-energization of latching solenoid S3 is required not only to permit the restoration of the active check stop, but also to permit the re-cycling of the apparatus. It is also to be appreciated that solenoid S3 must be energized at the beginning of the machine cycle to operate the check stop mechanism. Should solenoid S3 not be energized, as might occur by a machine operation not specifically described herein, stud 517 being seated against shoulder 515 of latching plate 510 would block even the forward movement of slides 506 and 232, so that the check stop mechanism would not be cycled, spring 230' being merely loaded and unloaded by cam 92.

In an Account Number operation, performed when lever 300 is set in its "A" position, the active stop is the account number stop 304, which means that the amount stop 303 must be held down; and the account number stop must be in a raised position at the beginning of the cycle to intercept the check, must be lowered during the cycle to permit the check to be ejected, and must again be raised at the beginning of the next succeeding cycle if in that succeeding cycle the account number stop is again to be the active one.

Setting of lever 300 in its "A" position acts through the mechanism including linkages 428 and 430 to remove arm 396 from pin 304', thus permitting account number stop 304 to rise, and also acts to lower forked arm 376 engaging pin 303' of the amount stop 303, which thereby lowers the amount stop 303.

The operator then takes a check from the storage hopper 4, reads the account number, introduces the account number into the same keyboard 3, as in the Amount operation by depressing the numerical keys 8, depresses A/C key 10', and inserts the check into feeding chute 5, substantially the same as in the procedure in the above-described Amount operation. In this case, however, the check would be fed by belt 29 until it is intercepted by account number stop 304 for printing the introduced numerical values in the account number encoding field.

With the check intercepted and properly positioned by the account number stop 304, the condition of the electrical circuit would be the same as illustrated in FIG. 3 and as described above in connection with the Amount operation, with the following exception: Setting lever in its "A" position actuates switch SW12 so that its movable contact SW12a engages contact SW12c, instead of switch SW12b as in the previous operation. This causes the energization of relay RA through the circuit including contacts SW12a and SW12c of switch SW12, and contacts SW11b and SW11a of switch SW11, to line 450. The energization of relay RA actuates its two sets of contacts RA-1 and RA-2 to control the circuit for the Account Number operation. That is, contact RA-1a is actuated to engage contact RA-1c, which thereby places switch SW13 (controlled by A/C key 10″) in the energizing circuit of solenoid S1. Also, contact RA-2a engages contact RA-2c thereby placing the account number registration circuit (including photocell P3, tube T3 and switch SW10) in the energizing circuit of corner relay RC. Assuming that the check is properly positioned with respect to the account number stop 304, that a numerical value has been introduced by depressing one of numerical keys 8, and that the A/C key 10″ has also been depressed, it is seen that cycling solenoid S1 will be energized to drive the apparatus through one cycle of operation, the energizing circuit for the solenoid including line 450, switch SW4, contacts RS-1, contacts RC-1, contacts RA-1a and RA-1c, switch SW13, solenoid S1 and line 451.

At this point, before the apparatus actually begins to cycle, slides 232 and 506, and therefore switch SW20, are in the same condition as described in the Amount operation and as illustrated in FIG. 3, namely in the condition where its movable contact SW20a engages its contact SW20b. It will also be appreciated that since skew relay RS has also been energized by the proper positioning of the check, closing is contacts RS-2, the check stop latching solenoid S3 is energized at this point causing its latching plate 510 to be pivoted downwardly out of engagement with slide 506.

The cycling of the apparatus for this Account Number operation is the same as described above in connection with the Amount operation, it being understood that in this case the account number stop 304 is the active one and would therefore be depressed during the machine cycle by the described mechanism including cam 92, slides 232 and 506, arm 233, shaft 234 and arm 382, and would be restored by a check passing through ejection chute 500 and operating switch SW12 to release latching plate 510 from engagement with slide 506.

In an Amount and Account Number operation, performed when lever 300 is set in its "C" position, the apparatus cycles twice. The first cycle is an Amount operation in which the amount stop 303 is the active one. With certain exceptions to be described below, the cycle is initiated in the same way as described above in connection with the Amount operation, and the machine performs in substantially the same manner as described in connection with an Amount operation. The second cycle is an Account Number operation in which the account number stop 304 is the active one, and in a similar manner follows the above-described Account Number operation.

The main exceptions referred to above arise because the check, after printing, is not to be ejected from the machine at the end of the first cycle, but rather is to be intercepted by the account number stop 304 so that printing can be effected in the account number encoding field during the second cycle. Accordingly, since the check does not pass through the ejection chute 500 to actuate switch SW21 at the end of the first cycle, separate means must be provided for performing the same function of switch SW21 in re-energizing the latching solenoid S3 at the proper time to permit slides 232 and 506 to restore. This separate means is a further circuit which includes switch SW11.

Returning first to the performance of the apparatus during the first cycle, setting lever 300 in the "C" position acts through the mechanism including linkages 428 and 430 to remove arm 396 from pin 304′ (thus permitting account number stop 304 to rise), and also to raise arm 376 straddling pin 303′ (permitting the amount stop 303 also to rise). After the operator has introduced the amount into the keyboard by depressing the appropriate keys 8, and has also depressed Item key 10′, the check inserted in feeding chute 5 would be fed by belt 29 until intercepted by amount stop 303, since that one is the first of the two raised stops in the path of the check. Assuming the check is properly positioned by the amount stop, the condition of the electrical circuit would be exactly the same as in the above-described Amount operation and as illustrated in FIG. 3. It will be recalled that setting lever 300 in its "C" position does not change the condition of switch SW12 from that illustrated in FIG. 3, since that switch is actuated from the position illustrated only when the lever 300 is moved to its "A" setting.

The circuit to cycling solenoid S1 is completed in the same manner as in the above-described Amount operation, whereupon the machine will go through the same cycle of operation as described in connection with the Amount operation, with the exception that the latch carrying ear 443 will be operative during the cycle to latch the amount stop 303 down preventing it from restoring to its raised position as would normally occur during an Amount operation. This latch and its manner of operation are described in considerable detail in the above-identified Bergland et al. application Serial No. 47,036. For purposes of the present description, it is sufficient merely to refer to the ear 443 carried by the latch, which actuates switch SW11 when the latch is operated. When switch SW11 is actuated by ear 443, its contact SW11a moves out of engagement with contact SW11b and into engagement with its contact SW11c. As described in the Bergland et al. application, this is the condition that the switch is found at the beginning of the second cycle, where it completes a circuit with switch SW12 to energize relay RA at the beginning of the second cycle. This will be further described below.

During the first cycle, however, when the latch carrying ear 443 is operated to actuate switch SW11, it is seen that the circuit is completed to energize latching solenoid S3, this circuit being from line 451 through solenoid S3, contacts SW20a and SW20c of switch SW20, contacts SW22a and SW22c of switch SW22, contacts SW21a and SW21c of switch SW21, and contacts SW11c and SW11a of switch S11, to line 450. It is thus seen that solenoid S3 is re-energized during the first cycle of a position "C" operation even though a check does not pass through ejection chute 500 to actuate switch SW21. Re-energization of solenoid S3 will remove latch plate 510 from slide 506 and will permit the slide to restore to its normal position. However, the depressed amount stop will not rise, as it normally would in an Amount operation, since it is held down by the latch carrying ear 443 as described above, and therefore, the instant that solenoid S3 is re-energized and slide 506 is permitted to restore is not as critical here as in the previously described operations where a slipping or long check could be caught by a restoring stop.

At the end of the first cycle, the check is thus automatically positioned by the account number stop 304 for printing the information to be entered in the keyboard in the account number encoding field. The operator then introduces the account number into the keyboard and depresses A/C key 10″ which initiates the second cycle for printing the account number on the check.

With the check properly positioned by the account number stop 304, the condition of the electrical circuit would be exactly the same as described in connection with the Account Number operation, except for the circuit for energizing relay RA. As mentioned earlier, lever 300 in its "C" position does not actuate switch SW12 from the position illustrated in FIG. 3, but switch SW11, having been actuated by ear 443 during the first cycle, now causes its movable contact SW11a to engage its contact SW11c. It will thus be seen that the energizing circuit to relay RA is now completed through contacts SW12a and SW12b of switch SW12, and contacts SW11c and SW11a of switch SW11, to line 450. With the relay RA energized, it is seen that A/C key 10″ and the account number stop 304 are effective to control the energization of cycling solenoid S1, in the same manner as described above in connection with the Account Number operation.

During the second cycle, the latch which carries ear 443 is released so that switch SW11 is normalized to its condition illustrated in FIG. 3, and therefore becomes ineffective to re-energize latching solenoid S3. However, as the check will pass through the ejection chute 500 at the end of the second cycle and will thereby actuate switch SW21, latching solenoid S3 will be re-energized in the same manner as in the previously described operations to remove latching plate 510 from slide 506 and to permit both stops to restore.

While the invention has been described with respect to a preferred embodiment thereof, it will be understood that the invention and/or various features thereof are capable of embodiment in other forms and that many changes and variations may be made within the spirit and scope of the invention as described in the following claims.

We claim:

1. Recording apparatus, comprising: recording means settable in accordance with information to be recorded; means for transporting a record medium through a predetermined path past said recording means to an exit in said apparatus; means for driving said apparatus through cycles of operation; a normally raised record stop in said path for intercepting said record medium at a position for recording thereon by said settable recording means; cyclically operated means for lowering the stop during a cycle of operation, after recording, to permit said record medium to pass to said exit; means disposed at a location past said stop in the direction of the exit for sensing the traverse of the record medium; and means actuated by said latter means for restoring said stop when the record medium traverses said location.

2. Recording apparatus, comprising: recording means settable in accordance with information to be recorded; means for transporting a record medium through a predetermined path past said recording means to an exit in said apparatus; means for driving said apparatus through cycles of operation; a normally raised record stop in said path for intercepting said record medium at a position for recording thereon by said settable recording means; cyclically operated means for lowering the stop during a cycle of operation, following recording, to permit said record medium to pass to said exit; latch means for latching said stop in its lowered position; means disposed at a location past said stop in the direction of the exit for sensing the traverse of the record medium; and means actuated by said latter means for releasing said latching means and to thereby restore said stop when the record medium traverses said location.

3. Recording apparatus, comprising: a stand; a printing unit including a keyboard and printing elements settable in accordance with information to be printed; means for pivotally mounting said printing unit on said stand; feeding belt means within said stand for transporting a record medium through a predetermined path past said printing elements to an exit in said apparatus; means for driving said apparatus through cycles of operation; a normally raised record stop in said path for intercepting said record medium at a position for printing thereon by said settable printing elements; cyclically operated means for lowering the stop during a cycle of operation, following printing, to permit said record medium to pass to said exit; latch means for latching said stop in its lowered position; means disposed at a location past said stop in the direction of the exit for sensing the traverse of the record medium; means actuated by said latter means for releasing said latching means and to thereby restore said stop when the record medium traverses said location; and further means actuated by pivoting said printing unit on said stand to expose said feeding belt means for releasing said latching means to restore said stop.

4. Recording apparatus, comprising: recording means settable in accordance with information to be recorded; means for transporting a record medium through a predetermined path past said recording means to an exit in said apparatus; means for driving said apparatus through cycles of operation; a normally raised record stop in said path for intercepting said record medium at a position for recording thereon by said settable recording means; a slide coupled to said stop and movable to lower same; cyclically operated means for moving said slide and thereby lowering said stop during a cycle of operation, following recording, to permit said record medium to pass to said exit; a latch normally operable to restrain said slide in its moved position; a solenoid operable, when actuated, to release said latch; means disposed at a location proximate to said exit for sensing the traverse of the record medium; and means actuated by said latter means for actuating said solenoid to cause same to release said latch and to thereby restore said stop when the record medium traverses said location.

5. Recording apparatus, comprising: recording means settable in accordance with information to be recorded; a record medium receiving chute on one side of said recording means; a record medium ejection chute on the other side of said recording means; continuously driven belt feeding means for transporting a record medium through a predetermined path from said receiving chute, past said recording means and through said ejection chute; means for driving said apparatus through cycles of operation; a normally raised record stop in said path for intercepting said record medium at a position for recording thereon by said settable recording means; a slide coupled to said stop and movable to lower same; cyclically operated cam means for moving said slide and thereby lowering said stop during a cycle of operation, following recording, to permit said record medium to pass to said ejection chute; a latch normally operable to restrain said slide in its moved position; a solenoid operable, when actuated, to release said latch; and means disposed in said ejection chute for sensing the traverse of the record medium through said ejection chute and for actuating said solenoid to cause same to release said latch and to thereby restore said stop.

6. Recording apparatus, comprising: recording means settable in accordance with information to be recorded; means for transporting a record medium through a predetermined path past said recording means to an exit in said apparatus; means for driving said apparatus through cycles of operation; stop mechanism in said path for intercepting said record medium at a position for recording thereon by said settable recording means; said stop mechanism comprising a pair of stops selectively activatable for intercepting said record medium to position same for recording in different fields thereof; presettable control means for determining which stop will be active during a cycle of operation; means maintaining the active stop in a raised position at the start of a machine cycle; cyclically operated means for lowering the active stop during a cycle of operation, following recording, to permit said record medium to pass to said exit; means disposed at a location past said stop in the direction of the exit for sensing the traverse of the record medium; and means actuated by said latter means for restoring said active stop when the record medium traverses said location.

7. Recording apparatus, comprising: recording means settable in accordance with information to be recorded; means for transporting a record medium through a predetermined path past said recording means to an exit in said apparatus; means for driving said apparatus through cycles of operation; stop mechanism disposed in said path for intercepting said record medium at a position for recording thereon by said settable recording means; said stop mechanism comprising a pair of stops selectively activatable for intercepting said record medium to position same for recording in different fields thereof; presettable control means for determining which stop will be active during a cycle of operations; means maintaining the active stop in a raised position at the start of a machine cycle; cyclically operated means for lowering the active stop during a cycle of operation, following recording, to permit said record medium to pass to said exit; latch means for latching said active stop in its lowered positions; means disposed at a location past said active stop in the direction of the exit for sensing the traverse of the record medium; and means actuated by said latter means for releasing said latching means and to thereby restore said active stop when the record medium traverses said location.

8. Recording apparatus, comprising: recording means settable in accordance with information to be recorded; means for transporting a record medium through a predetermined path past said recording means to an exit in said apparatus; means for driving said apparatus through cycles of operation; stop mechanism disposed in said path for intercepting said record medium at a position for recording thereon by said settable recording means; said stop mechanism comprising a pair of stops selectively activatable for intercepting said record medium to position same for recording in different fields thereof; presettable control means for determining which stop will be active during a cycle of operation; means maintaining the active stop in a raised position at the start of a machine cycle; a slide coupled to said stop mechanism and movable to lower said active stop; cyclically operated means for moving said slide and thereby lowering said active stop during a cycle of operation, following recording, to permit said record medium to pass to said exit; a latch normally operable to restrain said slide in its moved position; a solenoid operable, when actuated, to release said latch; means disposed at a location proximate to said exit for sensing the traverse of the record medium; and means actuated by said latter means for actuating said solenoid to cause same to release said latch and to thereby restore said active stop when the record medium traverses said location.

9. Recording apparatus, comprising: recording means settable in accordance with information to be recorded; means for transporting a record medium through a predetermined path past said recording means to an exit in said apparatus; means for driving said apparatus through cycles of operation; stop mechanism in said path for intercepting said record medium at a position for recording thereon by said settable recording means; said stop mechanism comprising a pair of stops selectively activatable for intercepting said record medium to position same for recording in different fields thereof; presettable control means for determining which stop will be active during a cycle of operation; said control means being presettable to a first position for making one stop active during the machine cycle, a second position for making the other stop active during the machine cycle, and a third position for making said one stop active during one cycle and said other stop active during the immediately succeeding cycle; means maintaining the active stop in a raised position at the start of a machine cycle; cyclically operated means for lowering the active stop during a cycle of operation, following recording, to permit said record medium to pass to said exit; means disposed at a location past said stop mechanism in the direction of the exit for sensing the traverse of the record medium; and means actuated by said latter means, and operable in all machine cycles when said control member is set in its first or second positions, and only during said succeeding cycles when said control member is set in its third position, for restoring said active stop when the record medium traverses said location.

References Cited in the file of this patent
UNITED STATES PATENTS 2,782,577    Beall _________________ Feb. 26, 1957